US008290877B2

(12) United States Patent
Herwig et al.

(10) Patent No.: US 8,290,877 B2
(45) Date of Patent: Oct. 16, 2012

(54) TECHNIQUES FOR TEMPORARY ACCESS TO ENTERPRISE NETWORKS

(75) Inventors: Nathaniel Christopher Herwig, Lawrenceville, GA (US); Erick Kobres, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 399 days.

(21) Appl. No.: 12/589,895

(22) Filed: Oct. 30, 2009

(65) Prior Publication Data

US 2011/0106708 A1   May 5, 2011

(51) Int. Cl.
    *G06Q 20/00* (2006.01)
(52) U.S. Cl. .............. 705/67; 705/14.37; 705/14.38; 705/14.39; 705/14.4; 705/14.33
(58) Field of Classification Search .......... 705/14.33, 705/14.37–14.39, 67
    See application file for complete search history.

(56) References Cited

U.S. PATENT DOCUMENTS

| | | | |
|---|---|---|---|
| 8,074,259 B1 * | 12/2011 | Levy et al. | 726/2 |
| 2007/0019670 A1 * | 1/2007 | Falardeau | 370/465 |
| 2008/0140509 A1 * | 6/2008 | Amjadi | 705/10 |
| 2009/0156208 A1 * | 6/2009 | Vesterinen et al. | 455/435.1 |

OTHER PUBLICATIONS

The Authoritative Dictionary of IEEE Standards Terms, 7th Ed., IEEE, Inc., New York, NY, Dec. 2000.*
"Wifi Proximity Marketing and How It Works", Iyazam website, date unknown, all pages. http://www.iyazam.com/wifi-proximity-marketing.html.*
"Zero™ Proximity Marketing Equipment and Proximity Network Solutions", Zero Proximity Marketing website, date unknown, all pages. http://www.zeroproximitymarketing.com/.*

* cited by examiner

*Primary Examiner* — James A Reagan
*Assistant Examiner* — Calvin Cheung
(74) *Attorney, Agent, or Firm* — Joseph P. Mehrle; Paul W. Martin

(57) ABSTRACT

Techniques for temporary access to enterprise networks are provided. Devices of customers are detected and authenticated for temporary enterprise network access to a facility of an enterprise when the customers are in a configurable geographic distance to that facility. Temporary access credentials for accessing select resources of the facility or enterprise network are pushed to the processing device upon successful authentication. When one or more terminating actions are detected, the temporary access credentials are revoked and access to the enterprise network ceases.

5 Claims, 3 Drawing Sheets

TECHNIQUES FOR TEMPORARY ACCESS TO ENTERPRISE NETWORKS

BACKGROUND

It is increasingly common for enterprises to provide their customers with access to privileged networks. For example, many retailers, banks, and other enterprises are beginning to allow their customers to access their internal networks for pricing information, stock availability, and comparing product features. This type of access is usually restricted to customers with valid enterprise accounts and the access is generally achieved by the customers logging on to a website of the enterprises.

Some other retailers also provide access to more "open" networks in a more general manner—e.g. Starbucks and McDonalds provide in-store Internet access to their customers. This type of access is nothing more than acting as an Internet Service Provider (ISP) for customers of an enterprise. That is, free in-store Internet access does not provide access to any of that enterprise's private network; the access simply permits customers to access the Internet while on the site of the enterprise. But because enterprises providing free Internet access control the access, advertisements and other customer enticements can be presented on the World-Wide Web (WWW) pages of the customers while they access the Internet within the store.

Enterprises are generally reluctant to provide access to their confidential networks because of security concerns and competitive concerns. When enterprises do provide such information, they like to severely restrict the access in a controlled setting and often require the individuals accessing the network to have specific customer accounts with those enterprises.

The problem with later approach is that customers may not even think of or even desire to access an enterprise's network while at home. Customers may also not have the forethought or planning to signup for an account to an enterprise prior to visiting the enterprise. That is, customers may only realize the benefit of accessing confidential information of an enterprise's network when the customers are at a store of the enterprise shopping.

SUMMARY

In various embodiments, techniques for temporarily accessing enterprise networks are presented. According to an embodiment, a method for accessing an enterprise's network is provided. Specifically, a processing device is detected as being within range of an enterprise network and controlled by a customer of an enterprise that is entering a facility of the enterprise. Next, the customer is authenticated for access to the enterprise network. Finally, a temporary credential is passed to the processing device to establish a temporary communication session with select resources of the enterprise network.

DETAILED DESCRIPTION

Figure 1:
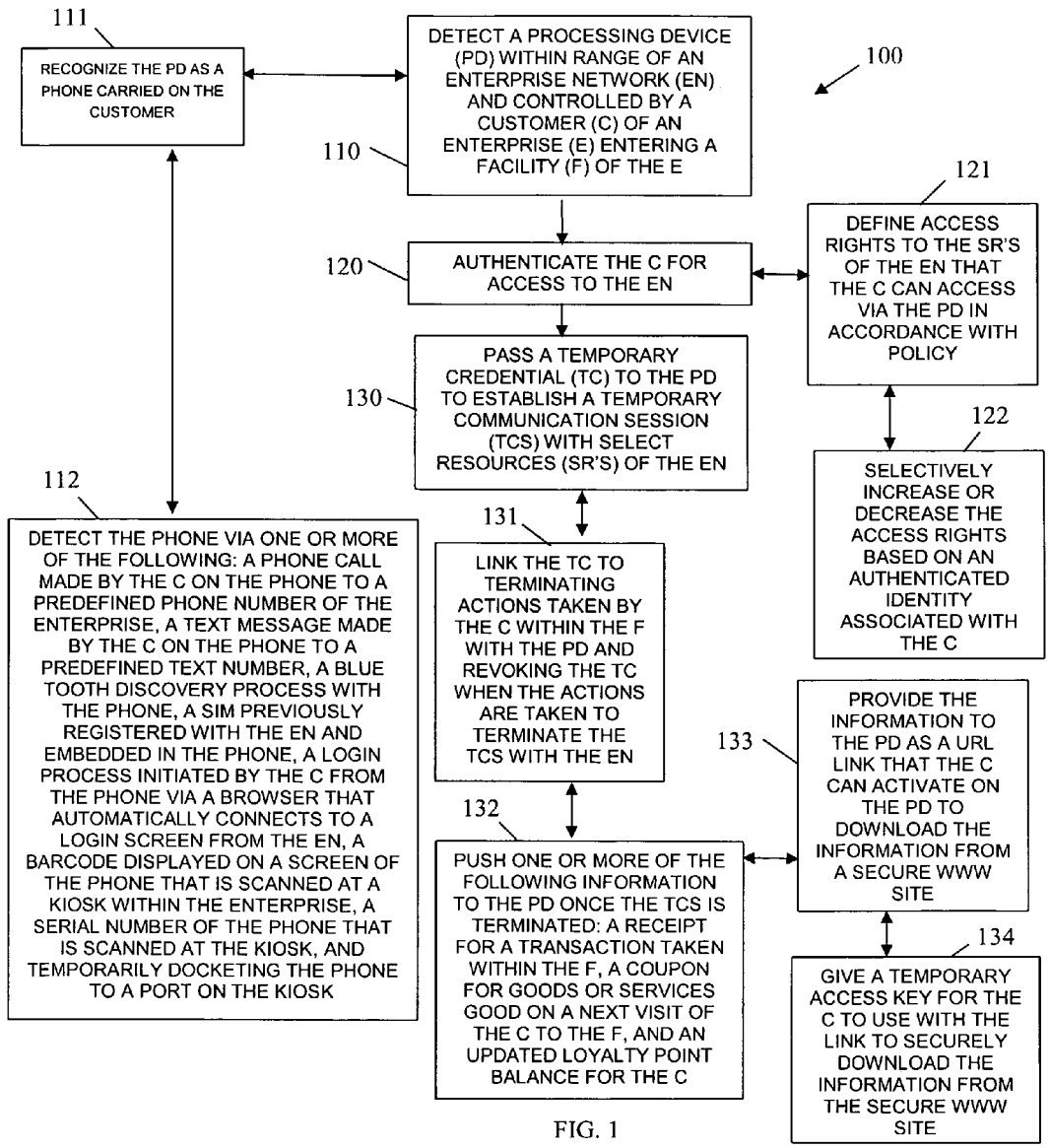
FIG. 1 is a diagram of a method for providing temporary access to an enterprise's network, according to an example embodiment.

FIG. 1 is a diagram of a method 100 for providing temporary access to an enterprise's network, according to an example embodiment. The method 100 (hereinafter "enterprise network access service") is implemented as instructions residing on a computer-readable storage medium and executed by one or more processors. The processors are specifically configured to process the enterprise network access service. The enterprise network access service operates over a network. The network is internal to an enterprise and is wireless, wired, or a combination of wired and wireless.

Furthermore, the network is controlled by an enterprise and the access to that network is geographically circumscribed with respect to customers that are granted temporary access to the network. That is, customers have to be within a configurable geographic proximity to a store or site of the enterprise to gain access to the enterprise network access service and thus the network of the enterprise.

As used herein a "store" refers to any business, such as a bank, grocery store, department store, etc.; any non profit organization, any governmental agency, or any physical site of an enterprise.

At 110, the enterprise network access service detects a processing device within range of an enterprise network. The processing device controlled by or in the possession of a customer that is frequenting a facility of the enterprise. Detection of the processing device can occur in a variety of automated or semi-automated manners.

For example, at 111, the enterprise network access service detects that the processing device is a phone carried by the customer into the facility of the enterprise.

Continuing with the embodiment of 111 and at 112, the enterprise network access service recognizes the phone via one or more of the following actions (automated or semi-automated): a phone call made by the customer on the phone to a predefined number of the enterprise; a text message made by the customer on the phone to a predefined text number; a blue tooth discovery process with the phone; a Subscriber Identity Module (SIM) previously registered with the enterprise network and embedded in the phone; a login process initiated by the customer from the phone via a browser that automatically connects to a login screen from the network; a barcode displayed on a screen of the phone that is scanned at a kiosk within the facility of the enterprise; a serial number of the phone that is scanned at the kiosk; and temporarily docketing the phone to a port on the kiosk.

It is also noted that the processing device can be more than just a phone. Although a phone is likely the most common present day usage that a customer would have in his/her possession when entering a facility of an enterprise. However, other processing devices are likely as well, such as laptops computers or so-called "netbook" computers, personal digital assistants, wearable computers, Internet-connected vehicles in an enterprise's site parking lot or premises, and the like.

At 120, the enterprise network access service authenticates the customer for access to the enterprise network. The degree of authentication can be configured and the mechanism used for configuration can be configured as well.

According to an embodiment, at 121, the enterprise network access service defines access rights to select resources (discussed below with reference to the processing at 130) of the enterprise network that the customer can access via the processing device. This defining occurs via evaluation of a customized policy. The policy may be specific to a specific customer, a specific class of customers, or specific to all customers. The select resources are automated resources of an enterprise such as software search services, database services, perhaps peripheral devices to print information, and the like. Some others resources that may be accessible can include wedding and baby registries, price lookups (perhaps occurring by self scanning using the customer's processing device), querying previous purchases and payment methods used by the customer, registered credit cards with the enterprise, credit limits extended by the enterprise to the customer, processing a loan request, staging an Automated Teller Machine (ATM) transaction before approaching an ATM within the facility, customer service numbers, and more. The access rights can prevent some internal and confidential enterprise information from being modified or even viewed or accessed in some situations, such as a resource associated with an employee database and the like.

Continuing with the embodiment of 121 and at 122, the enterprise network access service selectively increases or decreases the access rights based on an authenticated identity associated with the customer. For example, suppose the enterprise is a wholesale store such as Costco and a power customer with large purchases and very loyal to Costco authenticates while within the store via his/her processing device. In such a situation, the enterprise may want to grant this customer more access rights to enhanced enterprise resources from that which an infrequent customer of the enterprise would receive. So, the degree of access rights can be customized.

At 130, the enterprise network access service passes a temporary credential to the processing device to establish a temporary communication session with the select resources of the enterprise network.

In an embodiment, at 131, the enterprise network access service links the temporary credential to terminating actions taken by the customer within the facility with the processing device. The temporary credential is revoked when the actions are taken to terminate the temporary communication session with the enterprise network.

The terminating actions can be tied to transactions that the customer is performing within the facility with the select resources. For example, the customer complete a purchasing transaction, may perform so many transactions (e.g., multiple price look-ups, denial of service attacks, etc.) that suspicion is raised as to the motives of the customer, may attempt an illegal transaction trying to access a forbidden resource, may walk out of the facility and be outside a configurable range for which the temporary credential is valid, and the like.

Continuing with the embodiment of 131 and at 132, the enterprise network access service pushes one or more of the following information to the processing device once the temporary communication session terminates: a receipt for a customer transaction taken within the facility, a coupon for goods or services good on a next visit of the customer to the facility, an updated customer loyalty point balance, and the like.

Continuing with the embodiment of 132 and at 133, the enterprise network access service provides the information to the processing device as a Uniform Resource Locator (URL) hypertext link that the customer can activate on the processing device to download the information from a secure World-Wide Web (WWW) site.

Still continuing with the embodiments of 131-133 and at 134, the enterprise network access service gives a temporary access key for the customer to use with the link to securely download the information from the secure WWW site.

In some embodiments, a customer can subsequently access an URL of the enterprise and pull certain aspects of information regarding the visit to the enterprise, such as a receipt or related coupon. The receipt could be automatically imported into a database, such as Quicken® or items identified during the visit could be automatically loaded to a home shopping lists for future mail order or online purchasing or for future visits of the customer back to the enterprise. This can be done to another device, such as a home computer and the like when the customer is at home.

One now appreciates how customers can use there processing devices to more intelligently and efficiently interact with an enterprise while at a facility of an enterprise. This can be done with security to protect the enterprise and can be done so as to alleviate understaffed enterprises by allowing customers to do more on their own with less human intervention needed.

Essentially, the temporary credential is tied to workflow actions that can be taken by legitimate customers within the facility of an enterprise to give those customers an enhanced and automated experience by having access to some select resources of an enterprise that exists behind that enterprise's firewall and that which would not typically be accessible to those customers.

Figure 2:
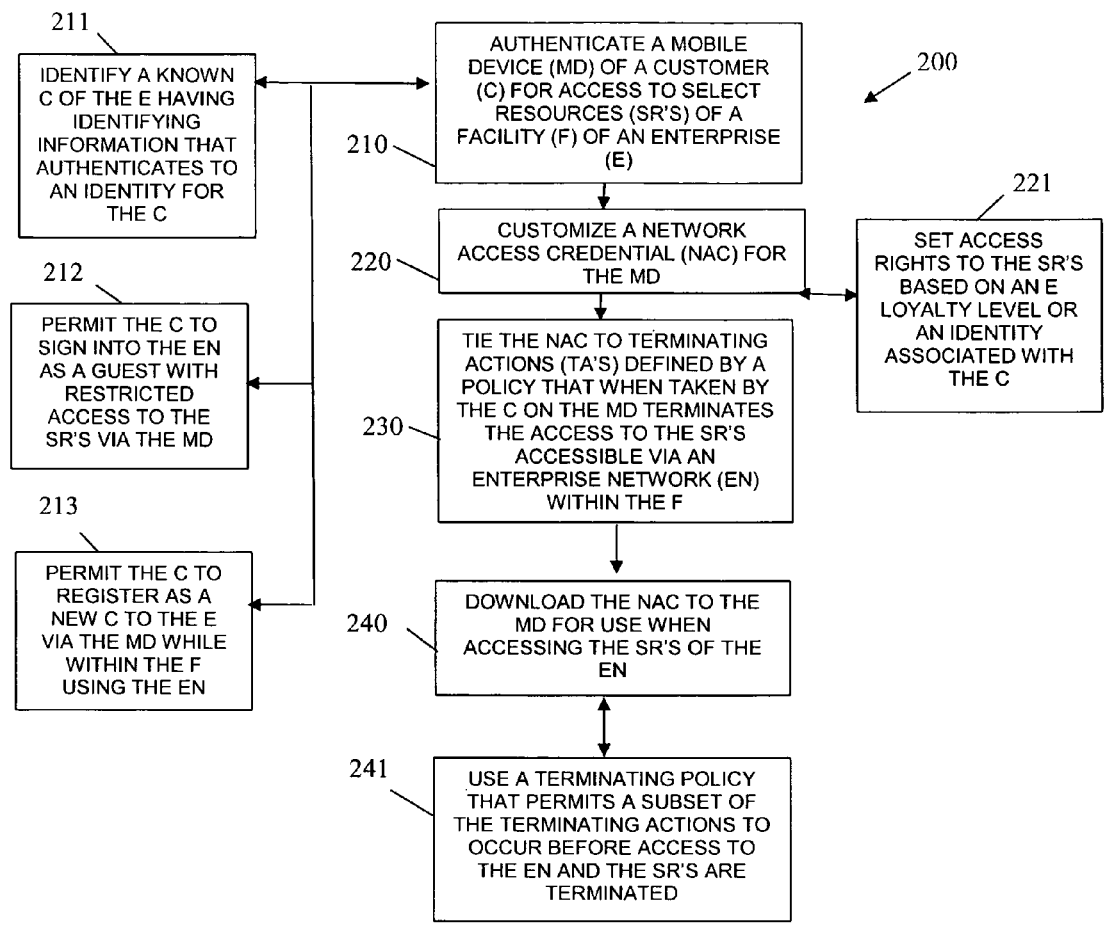
FIG. 2 is a diagram of another method for providing temporary access to an enterprise's network, according to an example embodiment.

FIG. 2 is a diagram of another method 200 for providing temporary access to an enterprise's network, according to an example embodiment. The method 200 (hereinafter "network access service") is implemented as instruction within a computer-readable storage medium that execute on one or more processors, the processors specifically configured to execute the network access service. The network access service is operational over a network; the network is wired, wireless, or a combination of wired and wireless.

The network access service represents another and in some cases enhanced perspective of the enterprise network access service, presented above with respect to the discussion of the FIG. 1.

At 210, the network access service authenticates a mobile device of a customer for access to select resources of a facility of an enterprise.

According to an embodiment, at 211, the network access service identifies a known customer of the enterprise that has specific identifying information, which the network access service authenticates to a specific and unique identity for that customer, such as a customer number for the enterprise.

In another case, at 212, the network access service permits the customer to sign into the enterprise network as a guest with restricted access to the select resources via the mobile device. This may occur when a customer does not want to register as a formal customer of the enterprise and perhaps does not want to be tracked and wants to remain anonymous. In such a situation, access to the select resources may be restricted by the network access service.

In yet another situation, at 213, the network access service permits the customer to register as a new customer to the enterprise via the mobile device while within the facility using the enterprise network. Here, a new customer is registered on site and this is done not via a clerk of the enterprise but by the customer via the mobile device connected to the enterprise network.

At 220, the network access service customizes a network access credential for the mobile device. The access credential can be customized based on the identity of the customer or non-identity (such as guest customers). Moreover, the access credential is customized for the mobile device of the customer.

According to an embodiment, at 221, the network access service sets access rights to the select resources based on the enterprise loyalty level or an identity associated with the customer.

At 230, the network access service ties or links the network access credential to terminating actions defined by a policy, such that when the terminating actions are taken by the customer on the mobile device, access to the select resources accessible via an enterprise network within the facility is terminated.

At 240, the network access service downloads the network access credential to the mobile device for use when accessing the select resources of the enterprise network. That is, the network access credential gives restricted, controlled, and monitored access to internal resources within the enterprise network.

In an embodiment, at 241, the network access service uses a terminating policy that permits a subset of the terminating actions to occur before access to the enterprise network and the select resources are terminated. In other words, it may take more than one terminating action to revoke the network access credential. However, a specific terminating action can singularly cause revocation depending upon its severity. The specific actions causing termination or subsets of actions causing termination are configurable by an enterprise.

It is also noted that the network access service permits tracking actions taken by a customer, this can lead to improved customer relationship management. This can also permit patterns of multiple customers to be mined to improve the customers' experiences when visiting a facility of an enterprise. In some cases, the network access service may generate a survey for a customer to take to get instant feedback on the customer's experience while at the enterprise's facility. A customer may even be granted additional loyalty points for taking such a survey, given a small gift, given a small in-store credit, and/or given a coupon for an item the customer is purchasing that day within the facility.

Figure 3:
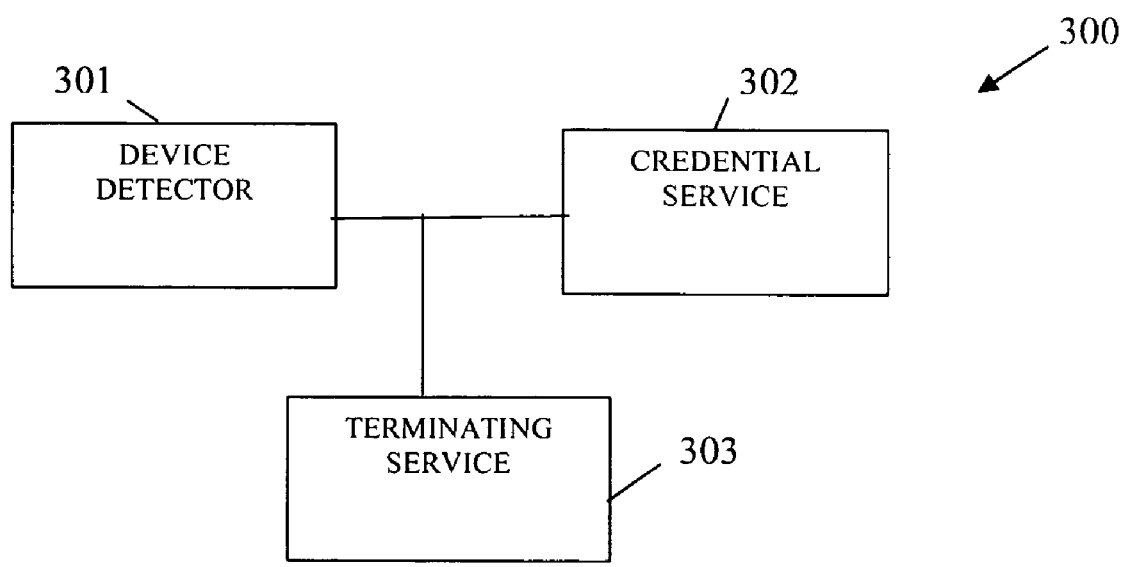
FIG. 3 is a diagram of an enterprise network access system, according to an example embodiment.

FIG. 3 is a diagram of an enterprise network access system 300, according to an example embodiment. The enterprise network access system 300 is implemented as instructions residing in computer-readable storage media and to execute on one or more processors of a network. The network is controlled within an enterprise; it may or may not be accessible over the Internet. However, the access to the network is controlled herein based on a geographic proximity of a customer to a facility of the enterprise that has the network. The network includes confidential or proprietary information of the enterprise that is typically not available to the general public via access over the Internet.

The enterprise network access system 300 implemented, inter alia, the methods 100 and 200 of the FIGS. 1 and 2, respectively.

The enterprise network access system 300 includes a device detector 301, a credential service 302, and a terminating service 303. Each of these components and their interaction with one another will now be discussed in turn.

The device detector 301 is implemented in a computer-readable storage medium and executes on one or more processors of an enterprise network. Example aspects of the device detector 301 were presented in detail above with reference to the methods 100 and 200 of the FIGS. 1 and 2, respectively.

The device detector 301 is configured to detect a processing device of a customer that comes within a configurable distance of a facility for an enterprise. The device detector 301 then notifies the credential service 302 of the newly detected processing device entering the facility or in proximity to the facility (parking lot, etc.).

According to an embodiment, the device detector 301 is a kiosk located within the enterprise's facility.

In another case, the device detector 301 is configured to detect the processing device automatically. This was discussed above with reference to the method 100 of the FIG. 1.

In yet another configuration, the device detector 301 is configured to detect the processing device upon some initial action taken by the customer using the processing device to make contact with the device detector 301. Again, this was discussed above with reference to the method 100 of the FIG. 1.

The credential service 302 is implemented in a computer-readable storage medium and executes on one or more processors of the enterprise network. Example aspects of the credential service 302 were presented in detail above with reference to the methods 100 and 200 of the FIGS. 1 and 2, respectively.

The credential service 302 is configured to authenticate the customer and pass a temporary access credential to the processing device of the customer. The credential service 302 is also configured to tie or link the temporary access credential to one or more terminating actions taken by the customer with the processing device while within the configurable distance of the facility.

The terminating service 303 is implemented in a computer-readable storage medium and is to execute on one or more processors of the enterprise network. Example aspects of the terminating service 303 were presented in detail above with reference to the methods 100 and 200 of the FIGS. 1 and 2, respectively.

The terminating service 303 is configured to revoke the processing device's access to an enterprise network and select resources of that enterprise network when one or more terminating actions occur.

According to an embodiment, the select resources include, but are not limited to, software services that permit one or more of the following within the enterprise network: scanning bar codes of products within the facility to determine if inventory exists or to request specific pricing; access to an enterprise sales database, access to an enterprise inventor database, access to enterprise loyalty details, and/or access to enterprise facility locations, hours of operation, phone numbers, and/or web site links.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on a processor configured to execute the method, comprising:

detecting, at the processor, a processing device within a range of an enterprise network and controlled by a customer of an enterprise entering a facility of the enterprise, the range is within a configurable geographic proximity to the facility, wherein the facility is a physical site representing a store of the enterprise that the customer is frequenting, wherein detecting further includes detecting the processing device via one of: a phone call made by the customer on the portable device to a predefined phone number of the enterprise, a text message made by the customer on the portable device to a predefined text number, a Subscriber Identity Module previously registered with the enterprise network and embedded in the portable device, a barcode displayed on a screen of the portable device that is scanned at a kiosk within the enterprise, a serial number of the portable device that is scanned at the kiosk, and temporarily docking the portable device on a port on the kiosk;

authenticating, at the processor, the customer for access to the enterprise network, wherein authenticating further includes linking the temporary credential to terminating actions taken by the customer within the facility with the processing device and revoking the temporary credential when the actions are taken to terminate the temporary communication session with the enterprise network;

passing, at the processor, a temporary credential to the processing device to establish a temporary communication session with select resources of the enterprise network; and pushing one or more of the following information to the processing device once the temporary communication session is terminated: a receipt for a transaction completed within the facility, a coupon for goods or services good on a next visit of the customer to the facility, and updated loyalty point balance for the customer, wherein pushing further includes providing the information to the processing device as a Uniform Resource Locator (URL) hypertext link that the customer can activate on the processing device to download the information from a secure World-Wide-Web (WWW) site and/or permitting certain aspects of the information to be subsequently acquired via the URL from a home device of other device at a later time by the customer.

2. The method of claim 1, wherein detecting further includes recognizing the processing device as a cellular or satellite phone carried on the customer.

3. The method of claim 1, wherein authenticating further includes defining access rights to the select resources of the enterprise network that the customer can access via the processing device in accordance with policy.

4. The method of claim 3, wherein defining further includes selectively increasing or decreasing the access rights based on an authenticated identity associated with the customer.

5. The method of claim 1, wherein providing further includes giving a temporary access key for the customer to use with the link to securely download the information from the secure WWW site.

* * * * *